United States Patent [19]

Kubota et al.

[11] Patent Number: 4,514,767
[45] Date of Patent: Apr. 30, 1985

[54] APPARATUS FOR MAKING MASKS AND/OR BLOCK COPIES FOR PRINTING

[75] Inventors: Yasuo Kubota; Kazuhiko Tanaka; Kazuyuki Kikushima, all of Tokyo, Japan

[73] Assignee: Dai Nippon Insatsu Kabushiki Kaisha, Tokyo, Japan

[21] Appl. No.: 452,870

[22] Filed: Dec. 23, 1982

[30] Foreign Application Priority Data

Dec. 26, 1981 [JP] Japan ................. 56-214319

[51] Int. Cl.³ .................. H04N 1/40; H04N 5/65
[52] U.S. Cl. .................. 358/280; 358/284; 358/257; 382/54; 382/57; 355/79
[58] Field of Search .......... 358/280, 282, 284, 256, 358/257, 96, 75, 80; 382/57, 55, 54, 51, 41; 355/74, 79, 125, 126, 77; 352/87, 89, 45, 46

[56] References Cited

U.S. PATENT DOCUMENTS

| | | | |
|---|---|---|---|
| 4,072,818 | 2/1978 | Loviello | 358/284 |
| 4,300,170 | 11/1981 | Sakamoto | 358/293 |
| 4,396,940 | 8/1983 | Tanaka et al. | 358/80 |

Primary Examiner—Howard W. Britton
Assistant Examiner—John K. Peng
Attorney, Agent, or Firm—Parkhurst & Oliff

[57] ABSTRACT

Masks or block copies for printing are fabricated by an apparatus comprising: a picture input device for obtaining through a filter a signal relating to the optical density of the picture of an object to be introduced as input; a picture processing device for subjecting the resulting picture optical density data from the picture input device to operational processing thereby to form a diagram figure; and a device for forming a mask or block copy for printing on the basis of the resulting diagram figure data obtained by means of the picture processing device.

4 Claims, 18 Drawing Figures

101

FIG. 5A
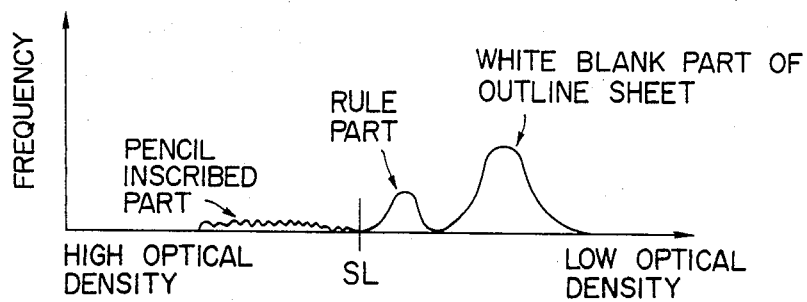
FIG. 5B
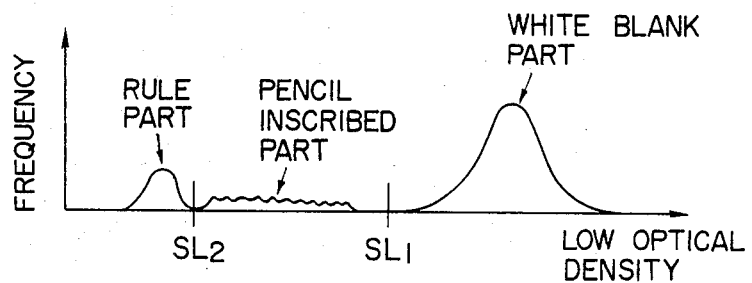
FIG. 6
| 1 | 5 | 9 | 13 |
|---|---|---|----|
| 2 | 6 | 10 | 14 |
| 3 | 7 | 11 | 15 |
| 4 | 8 | 12 | 16 |

APPARATUS FOR MAKING MASKS AND/OR BLOCK COPIES FOR PRINTING

BACKGROUND OF THE INVENTION

This invention relates to an apparatus for automatically preparing masks and/or block copies for printing.

In the present state of the art, reliance is being placed on handwork of skilled workers for the work of preparing block copies, cut masks, and cut-out masks in the fabrication of plates for printing, there being a lag in automatization and power saving.

Recently, automatic block copy plotting systems for this power saving are being developed. This is a combination of a digitizer which is a coordinate input device and a plotter with a minicomputer and is operated by introducing as input the coordinate of a specific point of the mask in a set layout specifying sheet onto the digitizer and plotting this.

The introduction of the input to the digitizer in this automatic block copy plotting system can be accomplished in simple manner if the shape of the mask is a rectangle, but when an irregular figure is to be introduced as input, inputing of a large number of coordinates must be carried out, and much time is required for the inputing procedure.

SUMMARY OF THE INVENTION

This invention seeks to provide an apparatus for preparing block copies and/or masks for printing in which the above described difficulties are overcome.

According to this invention in one aspect thereof, there is provided an apparatus in which: optical density data of the picture of an object to be introduced as input is derived by a picture input device; this optical density data is subjected to operational processing to form a line drawing picture; and this line drawing picture is utilized to automatically prepare a mask and/or block copy for printing. Here, the term "object to be introduced as input" means a layout specifying sheet, a block copy, a pattern original, or the like. Furthermore, the term "operational processing" implies thresholding, noise reduction, and thinning for two-value image.

According to this invention in another aspect thereof, there is provided an apparatus in which: image data of an original picture is picked up by a picture input device; by subjecting this data to a picture operation, a cut-out line is extracted; this cut-out line is displayed in superposed state with the original picture on a display, making possible necessary local correction; and, on the basis of the cut-out line data after correction, a cut-out mask is prepared.

The nature, utility, and further features of this invention will be more clearly apparent from the following detailed description with respect to preferred embodiments of the invention when read in conjunction with the accompanying drawings, briefly described below.

BRIEF DESCRIPTION OF THE DRAWINGS

In the drawings:

FIGS. 5A and 5B are graphs respectively showing optical density histograms of layout specifying sheets to become the bases of block copy graphic forms or patterns;

FIG. 6 is a diagram for a description of a small subarea for the purpose of elevating the precision of the optical density histogram of FIG. 5;

DETAILED DESCRIPTION OF THE INVENTION

Figure 1:
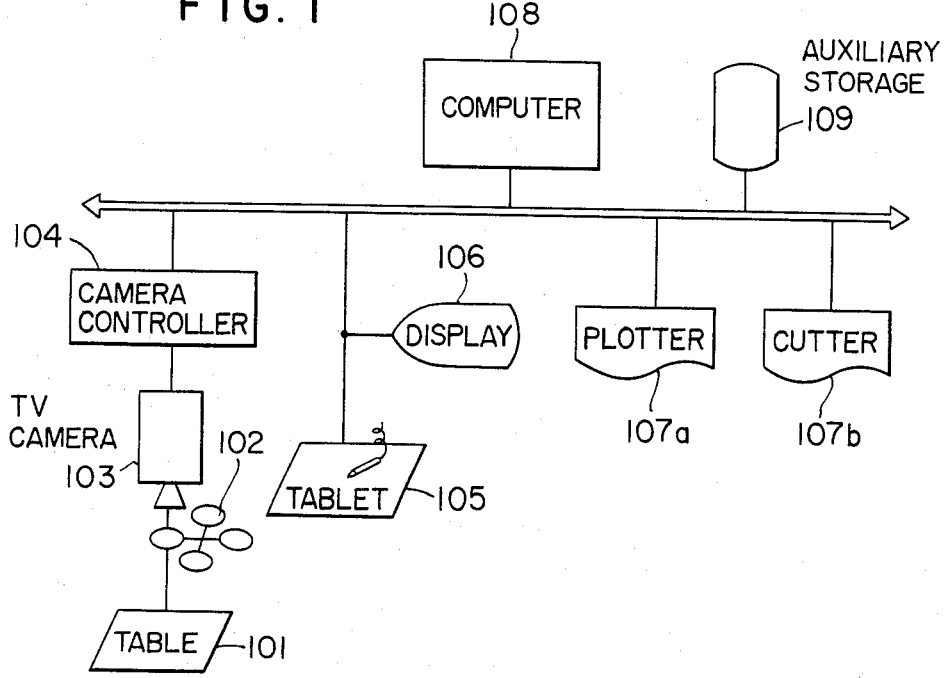
FIG. 1 is a block diagram showing the essential organization of one example of the apparatus according to this invention.

FIG. 1 illustrates the organization of one example of the apparatus for preparing masks and/or block copies for printing according to this invention. In this apparatus, a table 101 for setting thereon an input original copy is provided. On this table 101, a layout specifying sheet of a cut-out pattern original or block copy is set. The picture image of the input original copy thus set on the table 101 is picked up through a filter 102 by a TV camera 103. The filter 102 comprises four filters of, for example, three colors R, G, B and grey and is selected and used for the purpose of erasing the background of the picture or the rules of the layout specifying sheet.

The picture signal thus obtained by the TV camera is analog/digital converted by a camera controller 104 and sent into a data bus. This picture signal is a luminance signal obtained from the TV camera 103 which is represented as, for example, a digital value of eight bits and is fed into a computer 108. This computer is capable of carrying out signal transmission and reception between it and an interactive terminal having a tablet 105 and a display 106. The operater observes the display 106, and, if necessary, he can carry out correction of parts of the picture on the display 106 by manipulating the tablet 105.

After correction, the picture data can be stored in an auxiliary storage 109, or it can be transmitted to a drafting plotter 107a or a cutter 107b thereby to prepare a cut-out mask, a trimming mask, a block copy, or the like.

Next, the preparation of a cut-out mask from an original and a block copy or a cut mask from a layout specifying sheet will now be described with reference respectively to FIGS. 2A, 2B, and 2C and to FIGS. 3 and 4.

Figure 2A:
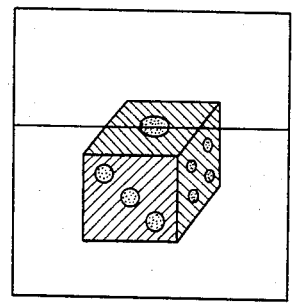
FIGS. 2A, 2B, and 2C are views for a description of the procedure of preparing a cut-out mask by means of the apparatus of the invention.
Figure 2A:
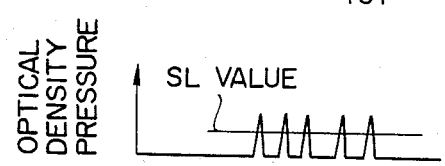
Figure 2B:
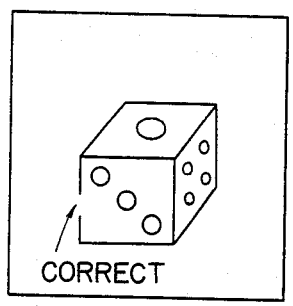
Figure 2C:
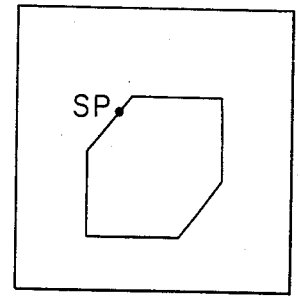

FIGS. 2A, 2B, and 2C are illustrations indicating the procedure of subjecting a picture to be cut out to an operational process and/or hard ware circuit such as thresholding, noise reduction or thinning, and then preparing a line drawing picture, and extracting from this line drawing picture the contour line, that is, the line defining the border relative to the background, thereby to prepare a cut-out mask. This procedure will now be described in greater detail.

(1) By attaching successively the filter 102 of the four colors of grey, R, G, and B to the TV camera 103, a planar or three-dimensional pattern original is introduced as input a maximum of four times. This number of times the original is introduced as input is determined by considering factors such as the color of the background.

(2) On the basis of the picture data relating to respective inputs by color, a two-value image is formed. For this purpose, as shown in FIG. 2A, the picture plane is scanned in the horizontal direction, for example, and a picture element of an absolute value of difference relative to the density (luminance) of the picture element adjacently on the right which is greater than a specific slice level value (SL) is designated as logic 1, while picture elements which do not fit this description are all designated as logic ∅.

Next, the picture plane is scanned in the vertical direction, and the designations logic ∅ and logic 1 of the picture elements thereof are similarly determined by the magnitude of the absolute value of the difference in density relative to the respective picture elements adjacently below. Thereafter, by carrying out picture operations such as logic OR operation of the pixel value picture detected in the horizontal and vertical directions, a two-value image is obtained for each color.

The scanning of the picture plane may be carried out in directions other than the horizontal and vertical directions such as, for example, an oblique direction.

(3) When a two-value image for each color has been thus obtained, the logic OR thereof is taken, and a line drawing picture is obtained. Noise reduction and other operational processing for line clarification are carried out. And, each of images obtained during the processing is displayed on the display 106, whereupon an image as shown in FIG. 2B is obtained. In this case, if there is a discontinuity or drop-out in the contour line on the left, it will be necessary to correct this. Therefore, correction is made by means of the tablet 105.

(4) Extraction of border lines with the backgrounds is carried out for line drawing pictures which have been corrected. This extraction is carried out by a program preset in the computer 108, for example, a stored program such as to extract a closed curve in the clockwise or counterclockwise direction from a specific starting point.

(5) By carrying out extraction according to this program, a cut-out line as indicated in FIG. 2C is obtained.

(6) With respect to this cut-out line, an output is sent to the plotter 107a, 107b. A two-layer film comprising a lamination of an opaque layer and a transparent layer and called a peel coated film is set in the plotter 107a, and by cutting away the opaque layer, a cut-out mask is obtained. A photoplotter may be used to apply an output to a photosensitive film. This method can be utilized in making a block copy or a cut mask from an outline specifying sheet.

Figure 3:
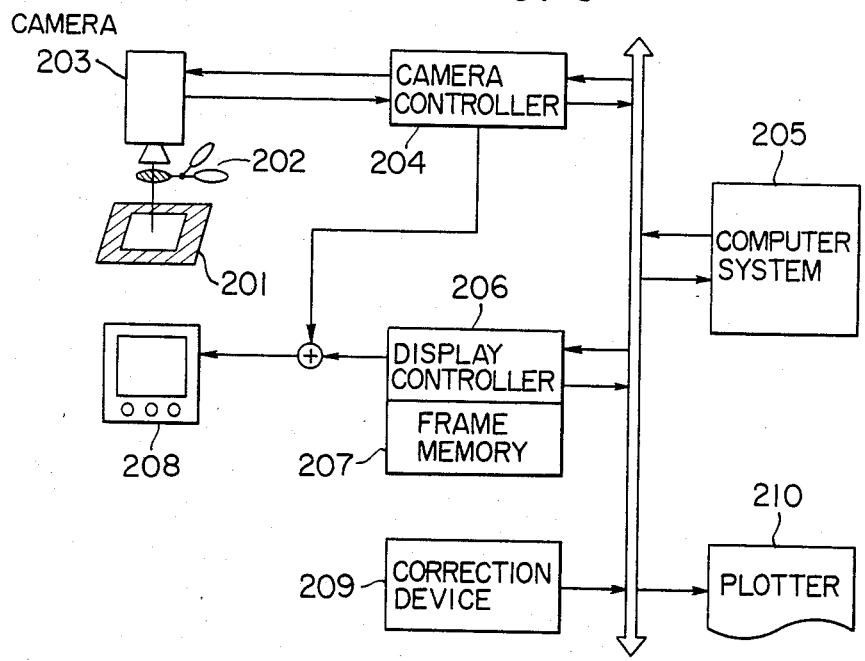
FIG. 3 is a block diagram showing the essential organization of another embodiment of the invention.

In another embodiment of this invention as illustrated in FIG. 3, an original picture laid on an original table 201 is picked up through a filter 202 by a TV camera 203, the resulting analog image data of which is fed to a camera controller 204. The camera controller 204 carries out analog-digital conversion of the analog image data relating to picture density from the TV camera 203 to produce digital data of the order of 256 steps and supplies the same to a computer system 205.

The computer system 205 subjects this digital data to picture operation and supplies the operational result by way of a display controller 206 to a frame memory 207. In this frame memory 207 is stored cut-out line data, which is converted by the display controller 206 into analog data (video signal or the like) and is supplied to a display 208 to be displayed thereby. Picture analog data (video signal or the like) from the TV camera controller 204 is also supplied to the display 208, and these two data are displayed in superposed state.

A correction input device 209 is provided in the vicinity of the display 208 so that the operator, observing the picture in the display 208 formed by the two items of data, can carry out a correction procedure with respect to parts requiring correction. The cut-out line data after this correction procedure produces a cut-out mask as a result of a pattern being plotted on the peel film by a plotter 210 provided with a cutter. This output device may be a device such as a photoplotter which produces an output directly on a photosensitive sheet.

The picture operation of the derived data of the analog image data, that is, correction by the method of interactive processing of the cut-out line data resulting from thresholding, contour line extraction, and thinning of contour line, is carried out in the computer system 205. Accordingly, the computer system 205 has programs for these data processing operations.

When a cut-out mask is to be prepared by means of this apparatus, the operator fixes the original on the original table 201. The picture of this original is then picked up through the filter 202 by the TV camera 203 which thereupon transmits analog image data by way of the camera controller 204 to the computer system 205 to be stored in the memory thereof. Upon completion of the inputing of the image data, the computer system carries out a picture operation including thresholding, contour line extraction, and thinning thereof with respect to the input data to extract a cut-out line and transmits this cut-out line data to the frame memory 207.

This data stored in the frame memory 207 is supplied through the display controller 206 to the display 208 and is displayed together with the data from the TV camera controller 204. That is, the cut-out line (FIG. 4A) and the original picture are displayed in superimposed state in the display 208 as shown in FIG. 4B.

Figure 4A:
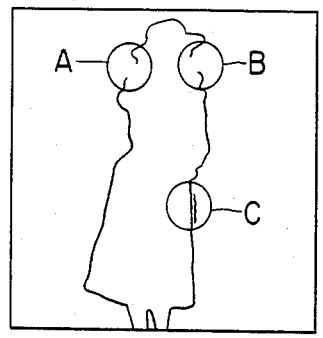
FIGS. 4A, 4B, and 4C are views for a description of rough cut-out line data in the invention and of the work of correction thereof.
Figure 4C:
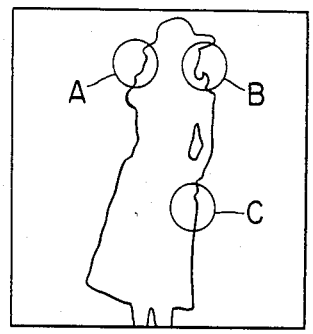
Figure 4B:
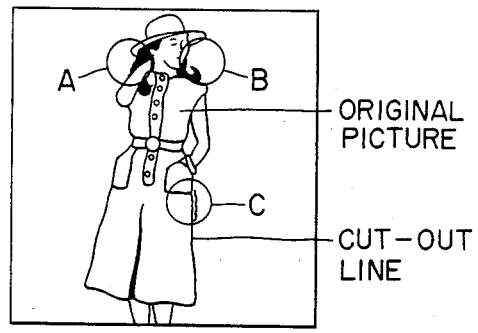

By observing these two superimposed images, the operator carries out correction of parts such as those at A, B, and C in FIG. 4A by means of the correction input device 209. This correction is carried out, as shown in FIG. 4C, by imparting an input such as a coordinate input of the number of points and input designating the manner in which these points are jointed, for example, by line elements or spline curves, as well as input causing deletion of lines between points. This correction is carried out interactively, the operator making this correction as he verifies the result thereof on the display 208. Upon completion of this correction, a cut-out mask is obtained from the plotter 210.

In the above described embodiment of the invention, the signal of the original picture is supplied as a video signal, as it is, to the display 208, but it is also possible to store the original picture as digital data together with the cut-out line data in the frame memory 207. Then a superimposed image can be obtained by converting those digital data in frame memory 207 into video signal together.

The preparation of the graphic form or pattern of a block copy is indicated in the explanatory views of FIGS. 5A, 5B, 6 and 7A through 7D. FIGS. 5A and 5B are graphs showing optical density histograms obtained from the surfaces of outline specifying sheets. FIG. 6 indicates a division of the outline specifying sheet surface for the purpose of improving the precision of deriving these optical density histograms. FIGS. 7A through 7D respectively indicate steps in the procedure of processing, for the purpose of preparing the block copy pattern, the picture data derived from the outline specifying sheet surface. This procedure will now be described in detail.

(1) The sheet surface content of the outline specifying sheet is introduced as input to the apparatus. The color of the filter (102, 202) at this time is appropriately selected according to the color of the rule of the outline specifying sheet.

(2) Only the parts inscribed by pencil are extracted from the picture data thus inputed. This is accomplished by thresholding, with a slice level as a reference datum, the pencil-inscribed parts clearly distinguished by the optical density levels in the optical density histogram of the outline specifying sheet as represented in FIGS. 5A and 5B. More specifically, in the case of FIG. 5A, only the parts of density values less than SL are taken out, while in the case of FIG. 5B, only the parts of $SL_2 <$ density value $< SL_1$ are taken out. In carrying out this processing, the drafting of this optical density histogram with high precision becomes a prerequisite.

To fulfil this requirement, the outline specifying sheet is divided into, for example, 16 small sub-areas, as shown in FIG. 6, and an optical density histogram is drafted for each sub-area. By this measure, since the optimum slice level value can be determined for each sub-area, deviations of reflected light can be easily dealt with. The method of transformation into a line drawing picture by using such an optical density histogram can be used also in the preparation of a cut-out mask from a pattern original.

Figure 7A:
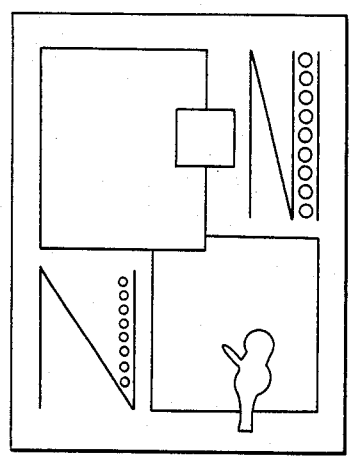
FIGS. 7A through 7D are views indicating the procedure of preparing block copy graphic forms based on an outline specifying sheet.

(3) When a pencil-inscribed line drawing extracted in this manner is displayed on the display (106, 208), it becomes as shown in FIG. 7A.

Figure 7B:
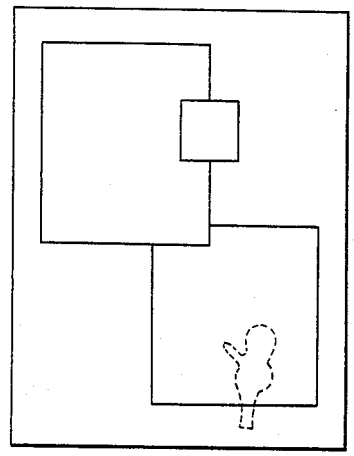
Figure 7C:
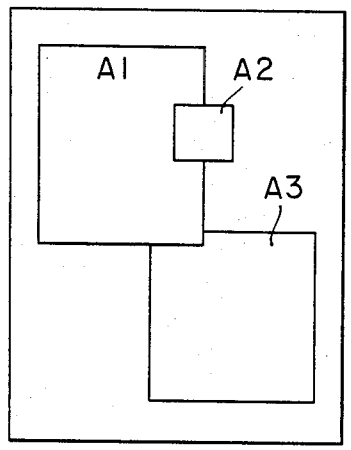
Figure 7D:
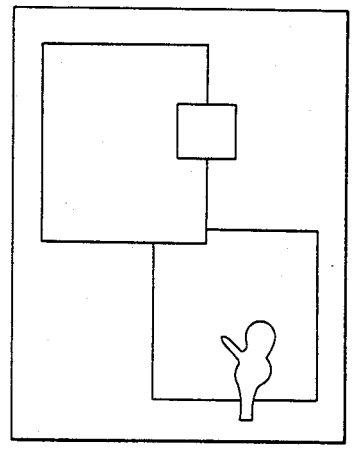

Since the contour line of a cut-out pattern is inaccurate, it is erased. In addition, local partial corrections are also carried out according to necessity. The picture thus obtained becomes as shown in FIG. 7B.

(4) A closed-curve recognition processing is carried out, and, with respect to closed curves thus recognized, distinguishing numbers $A_1$, $A_2$, and $A_3$ are caused to be displayed. By using these distinguishing numbers, the operator introduces as input superimposition information. For a rectangular figure, a coordinate compensation is indicated.

(5) In the case where there is a cut-out picture, an accurate cut-out curve which has been previously prepared is called, and position is designated and caused to be superimposed. Thus, the preparation of a block copy figure is completed.

(6) In accordance with the superimposed information introduced as input in paragraph (4) above, the necessary cut mask is automatically outputed on the plotter (107a, 210).

In the above described embodiment of the invention, a TV camera is used as a picture input device, but it may be replaced by another means such as an input device in which an image sensor is employed.

Figure 8:
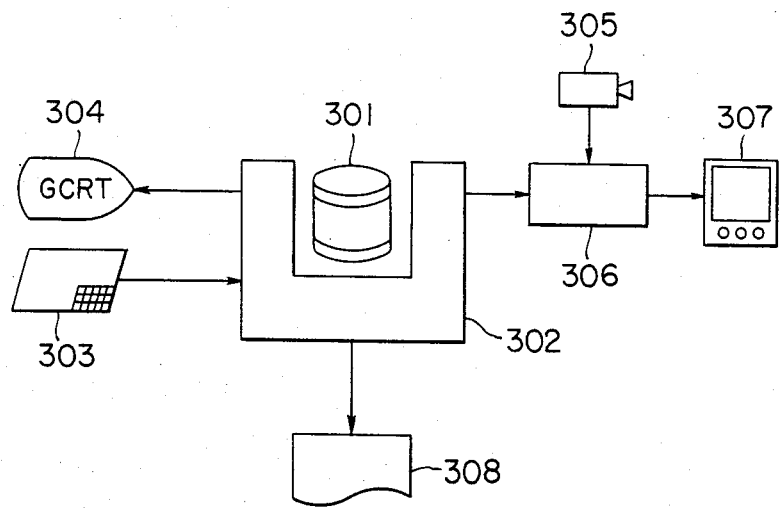
FIG. 8 is a block diagram showing the organization of a part of a device for correction processing in the apparatus for the invention.

Referring to FIG. 8, there is indicated therein the essential organization of a device for correction processing in the picture processing in the apparatus of this invention. In this device, an image data base file 301 is formed by an image data base obtained by extracting a diagram figure from the picture input. The writing and reading of data into and out of this file 301 is carried out by a data base management program 302. Here, the term "writing in" refers to that principally for correction, and "reading out" refers to that for display or for preparation of cut-out masks and block copies.

The data base management program 302 controls the input from a digitizer 303 and the outputs to a graphic cathode-ray tube (GCRT) 304, a superimpose display controller 306, and a plotter (or cutter) 308. The digitizer 303 determines the correction content and correction places by applying command inputs and coordinate inputs. The superimpose display controller 306 superimposes picture information from a TV camera 305 onto the recorded content of the image data base file 301 and causes the superimposed information onto a TV monitor 307.

Figure 9:
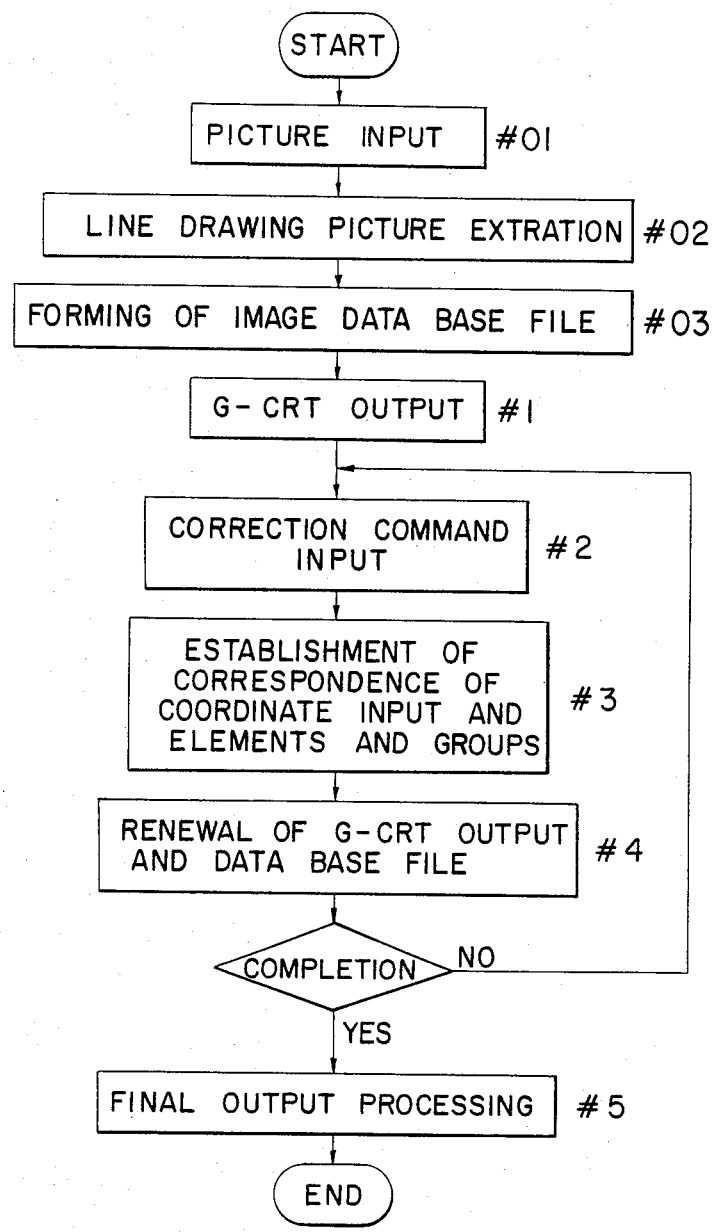
FIG. 9 is a flow chart for a description of the operation of the device part shown in FIG. 8.

The operation of the device shown in FIG. 8 of the above described organization is indicated by the flow chart shown in FIG. 9. First, a picture input is introduced (#01), and from this picture input, extraction of a line drawing picture is carried out (#02), whereby an image data file is formed (#03).

Figure 10:
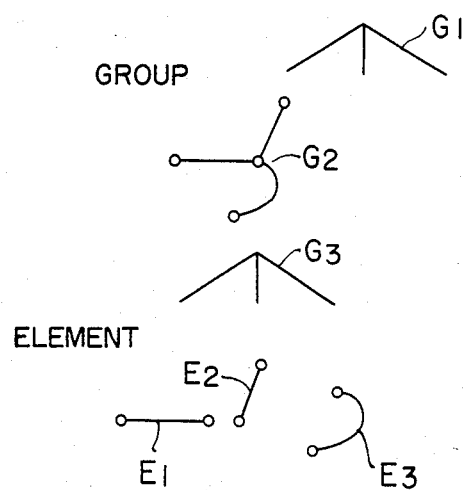
FIG. 10 is view showing elements and groups constituting the contents to be stored in an image data file in the device part shown in FIG. 8.

In this image data file, the line drawing pictures are recorded by basic units called elements and groups shown in FIG. 10. The term "element" refers to a line component or curve having an end point or a junction point at its opposite ends, representative elements being designated by $E_1$, $E_2$, and $E_3$ in FIG. 10. The term "group" refers to a single continuous diagram figure constituted by a collection of elements, representative groups being $G_1$, $G_2$, and $G_3$ in the same illustration. The above mentioned correction work is carried out with these elements or groups as units and in accordance with the data base management program 302.

The operation relating to this correction work is indicated by steps #1 through #5 in FIG. 9, which steps are incorporated in the data base management program 302.

First, the recorded content of the image data base file 301 is fed as input into the graphic CRT 304 (#1) thereby to display the picture. As he observes this displayed picture, the operator operates the digitizer 303 to introduce a correction command (#2). A correction command is the correction content, that is, delete, shift, write in, etc., and there are commands such as those set forth in the following table.

| Command designation | Meaning |
| --- | --- |
| DELE | Delete a specified element |
| DELG | Delete a specified group |
| TRNS | Move parallelly a specified group in translation |
| ADDE | Define an element anew and write additionally |

Together with this, a coordinate input is introduced. The introduction of this command input is accomplished by digitizing a specific position of a command menu sheet provided in a sub-section of a part of the digitizer 303. Since, in the introduction of the coordinate input, a cursor appears on the display surface of the graphic CRT 304 or a digitize point appears as a bright dot on the superimpose monitor 307, the operator can digitize accurately and positively.

On the basis of these command and coordinate inputs, the data base management program 302 carries out establishment of correspondence (#3) between the coordinate input and the elements and groups and, in conformance with variations of the line drawing picture, renews the recorded content (#4) of the image data base file 301.

In the organization of this device for correction processing, the graphic CRT 304 and the TV monitor 307 may be substituted by a single display means having the functions of both.

According to this invention as described above, by deriving optical density data of a picture by means of a picture input device and subjecting this data to operational processing, the original picture is rendered into a line drawing picture, by which a cut-out mask, a block copy graphic form, a cut mask, or the like is prepared. For this reason, in comparison with an apparatus in which coordinate inputing must be carried out minutely as in a known apparatus employing a digitizer, masks or block copies for printing can be made with much higher efficiency by the use of the apparatus of this invention and, mcreover, can correspond to various pictures. Furthermore, by using a TV camera for the picture input device, a three-dimensional object such as, for example, a package, can be inputed when used as an original without development or unfolding.

What is claimed is:

1. An apparatus for making masks for printing comprising:
   (a) a picture input device for deriving through a filter a signal relating to the optical density of a picture of an object to be introduced as input;
   (b) a picture processing device for subjecting the resulting picture optical density data from said picture input device to operational processing thereby to form a line drawing picture including:
   (i) a device for obtaining a picture signal relating to an outline specifying sheet, a block copy, or a pattern original from said picture input device to compute an optical density histogram,
   (ii) a device for setting an optimum slice value relating to the state of optical density distribution of picture elements on the basis of the resulting output of the computing device; and,
   (iii) a device for subjecting, on the basis of said optimum slice value, the output of said picture input device to thresholding; and
   (c) a device for forming a mask or block copy for printing on the basis of the resulting line drawing picture data obtained by means of the picture processing device.

2. An apparatus according to claim 1 wherein said picture input device derives two-value-image signals according to slice values set with respect respectively to small sub-areas respectively therefrom, the small sub-areas being of a specific number set on said picture, and thus forms a line drawing picture.

3. An apparatus for making a cut-out mask for printing comprising:
   (a) a picture input device for deriving a signal relating to picture optical density of an input original;
   (b) a picture operation device for subjecting the resulting data obtained from said picture input device to a picture operation to form cut-out line data;
   (c) a display and correction device having correction input means and operating on the basis of data respectively from the picture input device and the picture operation device, to display the cut-out line and to carry out correction of the cut-out line with respect to necessary parts; and
   (d) a device for forming a cut-out mask for printing on the basis of the corrected cut-out line data from the display and correction device.

4. An apparatus according to claim 3 wherein said display and correction device displays the cut-out line and an original picture in superimposed state.

* * * * *